United States Patent
Ben David et al.

(10) Patent No.: US 11,954,516 B1
(45) Date of Patent: Apr. 9, 2024

(54) TECHNIQUES FOR INSPECTING MANAGED WORKLOADS DEPLOYED IN A CLOUD COMPUTING ENVIRONMENT

(71) Applicant: Wiz, Inc., New York, NY (US)

(72) Inventors: Niv Roit Ben David, Tel Aviv (IL); Yaniv Shaked, Tel Aviv (IL); Yarin Miran, Rishon Lezion (IL); Raaz Herzberg, Tel Aviv (IL); Amir Lande Blau, Tel Aviv (IL)

(73) Assignee: WIZ, INC., New York, NY (US)

( * ) Notice: Subject to any disclaimer, the term of this patent is extended or adjusted under 35 U.S.C. 154(b) by 0 days.

(21) Appl. No.: 18/468,166

(22) Filed: Sep. 15, 2023

Related U.S. Application Data

(63) Continuation of application No. 17/804,212, filed on May 26, 2022.

(51) Int. Cl.
  G06F 21/57 (2013.01)
  G06F 9/455 (2018.01)
  H04L 9/40 (2022.01)

(52) U.S. Cl.
  CPC ........ G06F 9/45558 (2013.01); G06F 21/577 (2013.01); H04L 63/00 (2013.01); *G06F 2009/4557* (2013.01); *G06F 2009/45587* (2013.01); *G06F 2009/45595* (2013.01)

(58) Field of Classification Search
  None
  See application file for complete search history.

(56) References Cited

U.S. PATENT DOCUMENTS

| | | | |
|---|---|---|---|
| 10,002,247 B2 | 6/2018 | Suarez et al. |
| 10,032,032 B2 | 7/2018 | Suarez et al. |
| 10,063,445 B1 | 8/2018 | Preece |
| 10,503,904 B1 | 12/2019 | Singh et al. |
| 10,540,499 B2 | 1/2020 | Wailly et al. |
| 10,572,226 B2 | 2/2020 | Biskup et al. |
| 10,623,386 B1 | 4/2020 | Bernat et al. |
| 10,725,775 B2 | 7/2020 | Suarez et al. |
| 10,997,293 B2 | 5/2021 | Wiest et al. |
| 11,216,563 B1 | 1/2022 | Veselov et al. |
| 11,366,897 B1 | 6/2022 | Ramanathan et al. |

(Continued)

OTHER PUBLICATIONS

Microsoft Docs. "Create a VM from a managed image". Article. Jan. 5, 2022. https://docs.microsoft.com/en-us/azure/virtual-machines/windows/create-vm-generalized-managed.

*Primary Examiner* — Fatoumata Traore
(74) *Attorney, Agent, or Firm* — M&B IP Analysts, LLC

(57) ABSTRACT

A system and method for inspecting managed workloads in a cloud computing environment for cybersecurity threats improves inspection of managed workload service repositories, by only inspecting bases of managed workload deployed in the cloud computing environment. The method includes discovering a managed workload deployed in a cloud computing environment; determining an identifier of the managed workload, wherein the identifier includes an indicator to a base repository in which a base is stored, and wherein the managed workload is currently deployed in the cloud computing environment, the base repository further storing a plurality of bases, wherein a portion of the plurality of bases do not correspond to a deployed workload; accessing the base repository to pull the base; and inspecting the base of the deployed managed workload for a cybersecurity threat.

15 Claims, 4 Drawing Sheets

(56) References Cited

U.S. PATENT DOCUMENTS

| | | |
|---|---|---|
| 11,496,519 B1 | 11/2022 | Gupta et al. |
| 11,520,907 B1 | 12/2022 | Borowiec et al. |
| 11,546,360 B2 | 1/2023 | Woodford et al. |
| 11,614,956 B2 | 3/2023 | Tsirkin et al. |
| 11,645,390 B2 | 5/2023 | Vijayvargiya et al. |
| 11,750,566 B1 | 9/2023 | Montilla Lugo |
| 2007/0174915 A1 | 7/2007 | Gribble et al. |
| 2008/0320594 A1 | 12/2008 | Jiang |
| 2015/0304302 A1 | 10/2015 | Zhang et al. |
| 2016/0063466 A1 | 3/2016 | Sheridan et al. |
| 2018/0007087 A1 | 1/2018 | Grady et al. |
| 2018/0276084 A1 | 9/2018 | Mitkar et al. |
| 2018/0278639 A1* | 9/2018 | Bernstein ................. G06F 21/53 |
| 2018/0288129 A1* | 10/2018 | Joshi ........................ H04L 43/20 |
| 2018/0309747 A1* | 10/2018 | Sweet ................. G06F 9/45558 |
| 2019/0058722 A1* | 2/2019 | Levin ...................... H04L 67/34 |
| 2019/0121986 A1* | 4/2019 | Stopel .................... G06F 21/577 |
| 2019/0220575 A1* | 7/2019 | Boudreau ................. G06F 8/63 |
| 2020/0082094 A1 | 3/2020 | McAllister et al. |
| 2020/0287927 A1 | 9/2020 | Zadeh et al. |
| 2021/0026932 A1* | 1/2021 | Boudreau ........... G06F 16/5866 |
| 2021/0089662 A1 | 3/2021 | Muniswamy-Reddy et al. |
| 2021/0216630 A1 | 7/2021 | Karr |
| 2021/0320794 A1 | 10/2021 | Auh et al. |
| 2021/0329019 A1 | 10/2021 | Shua et al. |
| 2022/0156396 A1 | 5/2022 | Bednash et al. |
| 2022/0263656 A1 | 8/2022 | Moore |
| 2022/0326861 A1 | 10/2022 | Shachar et al. |
| 2023/0325814 A1 | 10/2023 | Vijayan et al. |

\* cited by examiner

US 11,954,516 B1

TECHNIQUES FOR INSPECTING MANAGED WORKLOADS DEPLOYED IN A CLOUD COMPUTING ENVIRONMENT

CROSS-REFERENCE TO RELATED APPLICATIONS

This application is a continuation of U.S. patent application Ser. No. 17/804,212 filed May 26, 2022, all contents of which are hereby incorporated by reference.

TECHNICAL FIELD

The present disclosure relates generally to cybersecurity and specifically to inspection of managed virtual instances.

BACKGROUND

Cloud computing infrastructure providers, such as Amazon® Web Services (AWS), Google® Cloud Platform (GCP), Microsoft® Azure, and Oracle® Cloud Infrastructure (OCI), are able to provision hardware resources to multiple tenants (i.e., users and groups of users) by creating an abstraction layer and provisioning the resources as requested.

Tenants in a cloud computing infrastructure may have their own cloud computing environments deployed on top of the infrastructure, with resources provisioned thereto. One advantage of a cloud computing infrastructure is therefore the ability to dynamically deploy workloads in the cloud computing environment. This ability is lacking in on-premise network environments, which require a physical installation in order to increase compute resources. Some cloud computing infrastructure providers include a managed virtual instance service. For example, AWS includes Amazon Elastic Container Service (ECS), which is a managed container service.

The service provided by ECS allows a user to upload a container image to a registry which stores the container image, and deploys containers based on the container image in response to demand. The service provides autonomous provisioning of resources, and automatic scaling, which may be beneficial in certain situations.

As another example, a virtual machine (VM) may be deployed using a managed image. For example, Microsoft® Azure Compute Gallery allows storing an image of a disk for a VM, and deploying VMs in a cloud computing environment based on the managed image.

As yet another example, AWS includes a Serverless Application Repository, which is a managed repository for serverless applications. The applications are stored in the repository, including, for example, source code of the application. Instances of the application may be deployed based on the stored application code.

Each of these example repositories may store hundreds, thousands, or more, of different images, application code, and the like, from which a virtual instance may be deployed. However, not every image, application code, and the like, has a corresponding virtual instance which is currently deployed.

While managed workloads certainly have benefits, their deployment is not always fully native to the cloud computing environment, as they are stored outside of the cloud computing environment. Therefore, managed workloads may be susceptible to threats which are more difficult to detect than for workloads which are deployed natively in the cloud computing environment.

Furthermore, a repository may contain thousands or more of different images. Scanning each image for cybersecurity threats is time consuming, resource intensive, and requires devoting cloud resources which add to the operation cost of the cloud environment.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for inspecting managed workloads in a cloud computing environment for cybersecurity threats. The method comprises: discovering a managed workload deployed in a cloud computing environment; determining an identifier of the managed workload, wherein the identifier includes an indicator to a base repository in which a base is stored, and wherein the managed workload is currently deployed in the cloud computing environment, the base repository further storing a plurality of bases, wherein a portion of the plurality of bases do not correspond to a deployed workload; accessing the base repository to pull the base; and inspecting the base of the deployed managed workload for a cybersecurity threat.

Certain embodiments disclosed herein also include a non-transitory computer readable medium having stored thereon causing a processing circuitry to execute a process, the process comprising: discovering a managed workload deployed in a cloud computing environment; determining an identifier of the managed workload, wherein the identifier includes an indicator to a base repository in which a base is stored, and wherein the managed workload is currently deployed in the cloud computing environment, the base repository further storing a plurality of bases, wherein a portion of the plurality of bases do not correspond to a deployed workload; accessing the base repository to pull the base; and inspecting the base of the deployed managed workload for a cybersecurity threat.

Certain embodiments disclosed herein also include a system for inspecting managed workloads in a cloud computing environment for cybersecurity threats. The system comprises: a processing circuitry; and a memory, the memory containing instructions that, when executed by the processing circuitry, configure the system to: discover a managed workload deployed in a cloud computing environment; determine an identifier of the managed workload, wherein the identifier includes an indicator to a base repository in which a base is stored, and wherein the managed workload is currently deployed in the cloud computing environment, the base repository further storing a plurality of bases, wherein a portion of the plurality of bases do not correspond to a deployed workload; access the base repository to pull the base; and inspect the base of the deployed managed workload for a cybersecurity threat.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
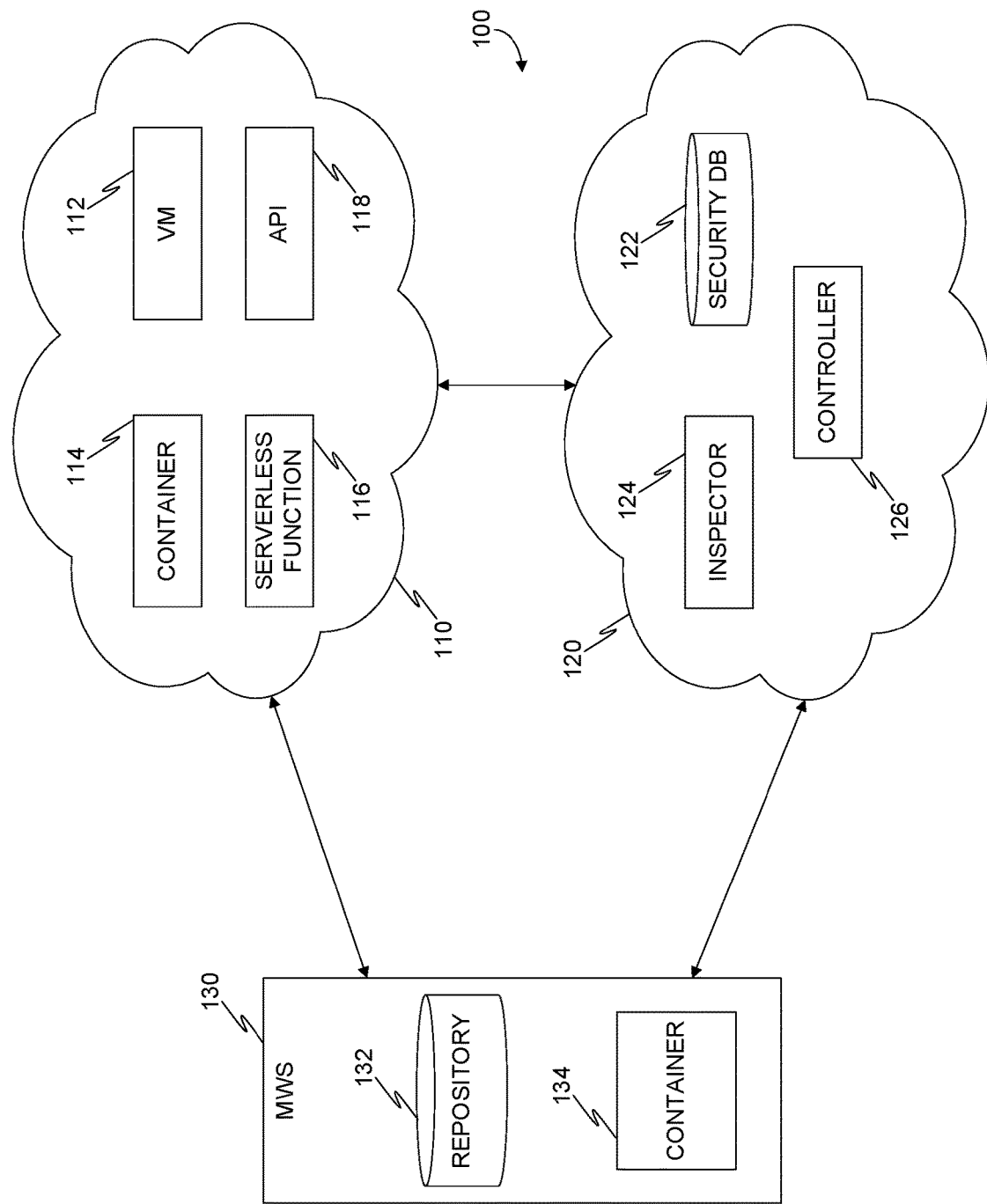
FIG. 1 is a diagram of a cloud computing infrastructure, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for inspecting a managed workload, such as containers, in a cloud computing environment. A managed workload is a workload which is generated (i.e., deployed) based off of an image file, application code, and the like, stored, for example, in a repository of a cloud computing infrastructure. A cloud computing infrastructure may be, for example, Microsoft® Azure, Google® Cloud Platform (GCP), Amazon® Web Services (AWS), and the like. Inspecting a repository of images, application code, and the like, of a cloud computing environment is a resource intensive and time consuming process. Often repositories contain images which do not correspond to deployed workloads, where a deployed workload is a workload which is, for example, deployed in a production environment. A production environment is a cloud computing environment which provides resources and services to users. By inspecting only the images, application code, and the like, of managed workloads which are actually deployed, resources devoted to inspection may be reduced, as well as a reduction in inspection time.

The various embodiments disclosed herein provide techniques for efficiently inspecting managed workloads which are actually deployed in a cloud computing environment at the time of inspection. The embodiments include discovering and accessing images, application code, and the like, from which the managed workloads are generated. While it is noted that selecting an image of a managed workload for inspection is a process which can be accomplished by a human, such a selection is accomplished inefficiently and inconsistently. Specifically, a human has subjective criteria for selection of managed workload images from an image repository, resulting in an inconsistent selection between different humans. Furthermore, due to the sheer size of the amount of managed workload images stored in a repository, a single human operator using their own same subjective criteria in selecting the images which should be inspected, is highly unlikely to be able to repeat the task of selection with a consistent result.

It is further recognized that a human may provide rules for selecting an image of a managed workload. However, such rules are again created using subjective criteria, and even when an initial set of rules is created, the nature of cloud computing environments is their fast-paced change, meaning a rule created now may be irrelevant in a few minutes, hours, or days, time. Applying such rules on a consistently changing environment would result in inconsistent application of the rules. Constantly creating rules would again result in an inconsistent application, as a human creates rules based on subjective criteria.

The disclosed embodiments avoid this inconsistent execution by generating objective rules which select managed workload images for inspection based on predefined criteria, selecting the managed workload images based on the predefined criteria, wherein the criteria includes detecting managed workloads actually deployed in a cloud computing environment at the time of inspection, and selecting for inspection only managed workload images which correspond to the workloads which are deployed at the time of inspection in the cloud computing environment.

FIG. 1 is an example of a diagram of a cloud computing infrastructure 100, implemented in accordance with an embodiment. A cloud computing infrastructure 100 may be, for example, Amazon® Web Services (AWS), Google® Cloud Platform (GCP), Microsoft® Azure, Oracle® Cloud Infrastructure (OCI), and the like. In an embodiment, a plurality of cloud computing infrastructures may be utilized, each having at least one cloud computing environment deployed thereon. A cloud computing environment 110 is deployed on the cloud computing infrastructure 100. A cloud computing environment 110 may be, for example, a virtual private cloud (VPC) deployed on GCP.

The cloud computing environment 110 includes cloud entities, such as resources and principals. A resource is a cloud entity which supplies functionality, such as processing power, memory, storage, communication, and the like. A resource may supply more than one functionality. Resources may include, for example, virtual machines (VMs) such as VM 112, container engines such as container engines 114, serverless functions such as serverless functions 116, and the like. The cloud computing environment 110 may further include an application programming interface (API), through which actions in the cloud environment may be triggered. A VM may be implemented using Oracle® VirtualBox. A container engine may be implemented using Kubernetes® or Docker®. A serverless function may implemented using Lambda®.

A principal is a cloud entity which acts on a resource, meaning it can request, or otherwise initiate, actions or operations in the cloud environment which cause a resource to perform a function. A principal may be, for example, a user account, a service account, a role, and the like. In an embodiment a principal is implemented as a data structure which includes information about an entity, such as username, a password hash, an associated role, and the like.

The cloud computing environment 110 is communicatively coupled with an inspection environment 120. The inspection environment 120 is a cloud computing environment. In an embodiment, the inspection environment 120 is deployed on the cloud computing infrastructure 100, in another cloud computing infrastructure, or a combination thereof. In certain embodiments a portion of the inspection environment 120 is deployed in the cloud computing environment 110. In some embodiments, certain workloads deployed in the inspection environment 120 may be deployed in the cloud computing environment 110.

The inspection environment 120 includes a plurality of inspector workloads, such as inspector 124. The inspector 124 is configured to inspect cloud entities of the cloud computing environment 110. In an embodiment, a snapshot may be generated based on a disk of a workload, such as the container 114. The snapshot may be mounted as a volume which is accessible by the inspector 124. The inspector 124 may inspect the volume for security objects, such as secrets, keys, user account information, and the like. In some embodiments, the inspector 124 inspects the volume for applications, operating systems, binaries, libraries, and the like. The inspector 124 is configured to detect cybersecurity threats, vulnerabilities, misconfigurations, exposures, and the like.

The inspection environment 120 further includes a security database 122, which is implemented as a graph database. A security graph may be stored on the security database 122. The security graph includes a representation of the cloud computing environment 110. For example, cloud entities of the cloud computing environment 110 may be represented each as nodes in the security graph. In an embodiment the security graph is generated based on objects detected by an inspector, such as inspector 124.

A controller 126 is further included in the inspection environment 120. In an embodiment the controller 126 is a workload deployed in the inspection environment 120 which is configured to initiate inspection of the cloud computing environment 110. For example, initiating inspection may include determining what cloud entities to inspect, when to inspect them, and the like.

The inspection environment 120 and cloud computing environment 120 are further communicatively coupled with a managed workload service (MWS) 130. A managed workload service 130 may be, for example, a managed container service, a managed disk service, a managed application service, and the like. While this example embodiment discusses a managed container service, the teachings may equally be applied to other managed workload services without departing from the scope of this disclosure. The MWS 130 may be deployed as a cloud computing environment on a cloud computing infrastructure.

A managed container service (MCS) may be, for example, Amazon® Elastic Container Service (ECS). A managed disk service may be, for example, Azure® Compute Gallery. A managed application service may be, for example, AWS® Serverless Application Repository. The MWS 130 includes a repository 132, and a managed container 134. In an embodiment, the repository 132 is configured to store container images based on which containers are deployed. In other embodiments, the repository 132 is configured to store disk images, application source code, and the like.

In some embodiments, the controller 126 is further configured to query the security graph to detect managed workloads. In an embodiment, the inspector 124 is configured to determine that the container 114 communicates with a managed container 134. The inspector 124 may be configured to perform such a determination by, for example, configuring the inspector 124 to query the API 118 to receive a network communication log of the cloud computing environment 110 and detect that the container 114 sends and receives network messages from the managed container 134.

In some embodiments, a name assigned to the managed container 134 may indicate that the managed container 134 is a managed workload. For example, a container named "example-webapp-ecs" is probably managed by ECS. Once a determination is made that a container is a managed container, the controller 126 is configured to send a request to the repository 132 to receive an image on which the managed container 134 is based. The image may then be inspected by the inspector 124.

In an embodiment, inspecting an image may include, for example, generating a disk based on the image, mounting the disk, and configuring an inspector to inspect the disk. In another embodiment, inspecting an application code may include, for example, providing the application code to an inspector, which is configured to detect cybersecurity threats in the application code.

Figure 2:
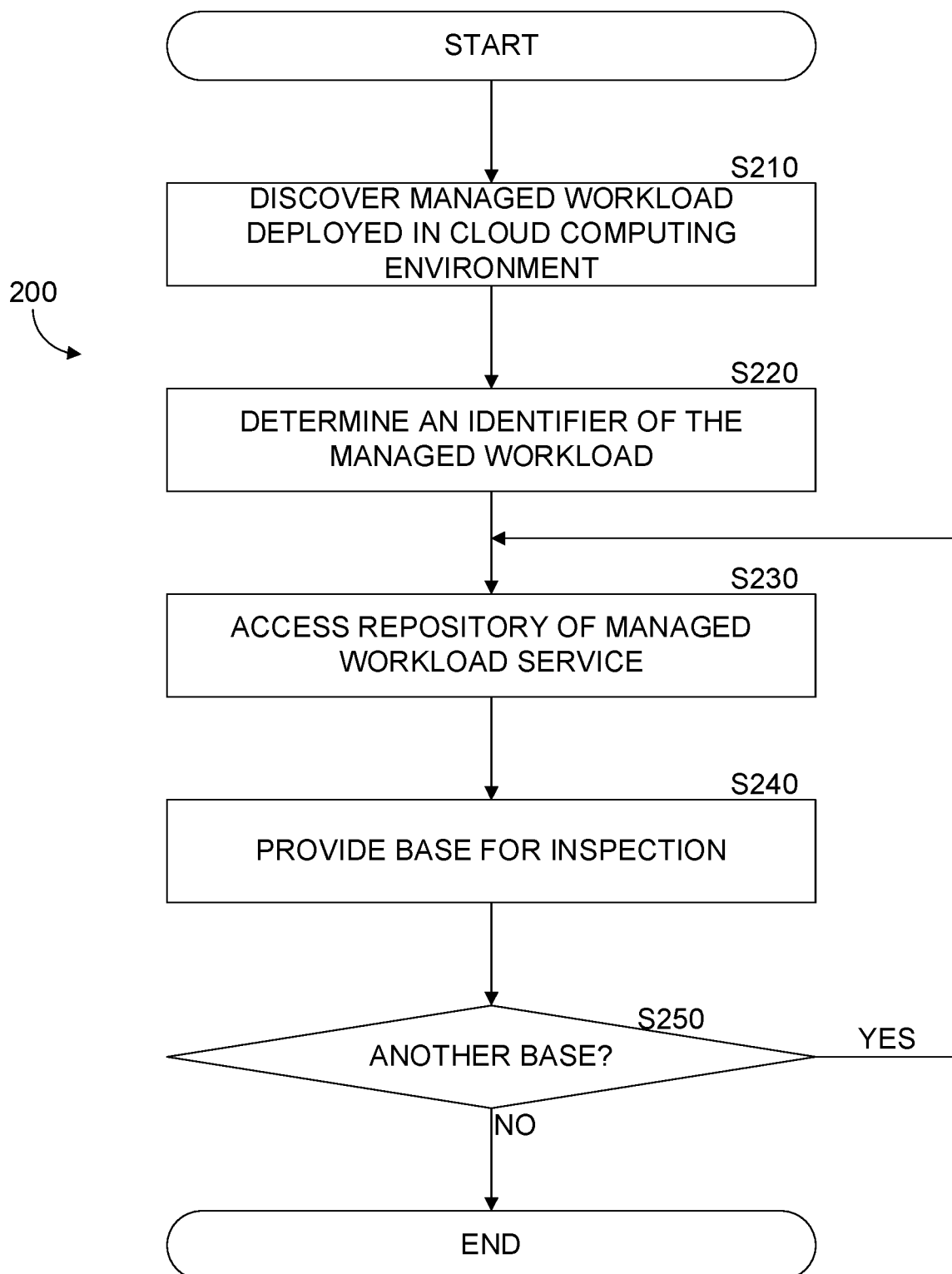
FIG. 2 is a flowchart of a method for inspecting managed workloads, implemented in accordance with an embodiment.

FIG. 2 is an example of a flowchart 200 of a method for inspecting managed workloads, implemented in accordance with an embodiment. An example method for inspecting a workload is discussed in more detail in FIG. 3 below. One advantage of the method described herein is that inspecting an image, application code, and the like, from which a plurality of managed workloads are actually deployed in a cloud computing environment allows to inspect a single image (e.g., once) rather than inspect each of a plurality of managed workloads which are deployed in the cloud computing environment.

At S210, a deployed managed workload is discovered. A managed workload may be, for example, a virtual machine (VM) generated using a managed disk service, a container generated using a managed image, a serverless function deployed using a managed application service, and the like. In an embodiment, discovering a managed workload includes detecting in a network traffic log communication between a workload deployed in a cloud computing environment, and another workload which is deployed outside of the cloud computing environment. In certain embodiments, detecting a managed workload includes parsing a name of a workload into elements, and matching an element against a list of known managed workload services.

A deployed managed workload is a workload which, at the time of inspection, is deployed in a cloud computing environment. A repository for managed workloads may include a large number of images, application code, and the like, which do not all correspond to workloads which are actually deployed. For example, older versions of a workload may be stored in the repository, without a clear indication that they are not actually deployed. By discovering a managed workload which is actually deployed in a cloud computing environment, and then selecting an image (or application code) which corresponds to the deployed managed workload, inspection of the entire repository is avoided, leading to a reduction in resources required for performing inspection for cybersecurity threats.

In an embodiment, a plurality of workloads may be discovered. In certain embodiments, a first portion of the plurality of workloads may be deployed in the cloud computing environment natively, and a second portion of the plurality of workloads may be managed workloads, such as managed containers. As used herein, a native deployment of a workload in a cloud computing environment is a deployment which is performed in response to an instruction generated by a user account, service account, and the like, associated with the cloud computing environment, while a managed workload is a workload, such as a container, VM, serverless function, and the like, which is deployed based on an instruction generated by a managed workload service, such as the MWS 130 of FIG. 1 above.

At S220, an identifier of the managed workload is determined. In some embodiments, a name assigned to the managed workload may indicate that the workload is a managed workload (i.e., generated based off of a managed disk, managed image, managed application code, and the like). For example, a container named "example-webapp-ecs" is probably managed by ECS. A name of the workload may be parsed into elements, and the elements may be matched against a list of known managed virtual workload services.

At S230, a repository of a managed workload service is accessed. In an embodiment, the repository is accessed to pull an image based off of which the managed workload is deployed. In an embodiment, accessing an image of the managed workload includes pulling the image from an image storage (i.e., repository). The image storage may be a managed workload repository, such as Amazon® Elastic Container Registry (ECR). For example, in response to determining that the managed workload is managed by ECS, Amazon ECR may be accessed with a request to pull the image corresponding to the determined identifier. In certain embodiments, a repository of a managed application service may be accessed to pull application code. In other embodiments, a repository of a managed disk service may be accessed to pull an image of a managed disk. A managed image, managed disk, managed application code, and the like, are referred to herein as a base, based off of which a workload may be deployed in a cloud computing environment.

At S240, the base is provided for inspection to detect cybersecurity threats. An example of a method for inspecting a container image is discussed in more detail in FIG. 3 below. In an embodiment, a workload, such as a container, may be deployed in an inspection environment based on an image pulled from a managed container repository. The deployed container may then be inspected, for example according to the method detailed below. A cybersecurity threat may be, for example, a vulnerability, an exposure, a misconfiguration, and the like.

At S250, a check is performed to determine if another base, of a different managed workload, should be inspected. If 'yes', execution may continue with another base at S230. Otherwise, execution may terminate.

Figure 3:
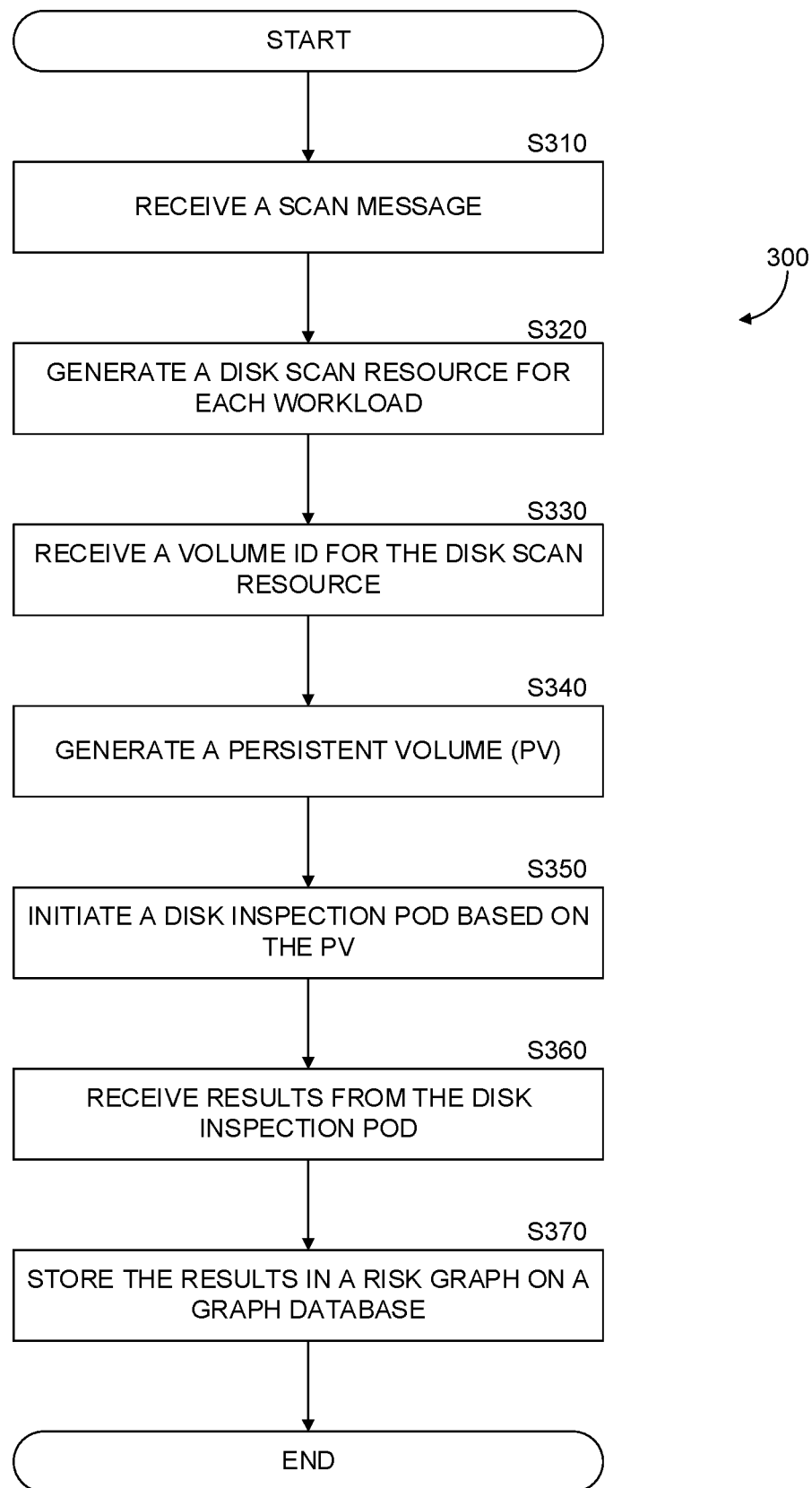
FIG. 3 is a flowchart of a method for inspecting a workload in a cloud computing environment, implemented in accordance with an embodiment.

FIG. 3 is an example flowchart 300 of a method for inspecting a workload in a cloud computing environment, implemented in accordance with an embodiment. In an embodiment the method is performed by the inspector 124. In certain embodiments the workload is a workload generated based off of any one of: an image from an image repository, a disk image from a managed disk service, and an application code from a managed application service. Inspection for cybersecurity threats is performed, in this embodiment, in a container-based computing environment.

At S310, an inspection message is received. The inspection message may be generated by a controller, such as controller 126 of FIG. 1 above. The inspection message may include an identifier of a container node on a cluster and an identifier of a workload (e.g., inspector) for inspecting the contents thereof.

At S320, a disk scan resource is generated. A notification may be generated by a scan broker and received by the operator to indicate that a disk scan resource should be generated. A disk scan resource may be implemented as a storage resource in a cluster. In an embodiment, the disk scan resource is generated by a disk manager service. A disk manager service may provision physical storage resources as virtual storage devices, in order to generate a disk scan resource, which may include one or more such virtual storage devices.

At S330, a volume identifier (ID) is generated for each disk generated for the disk scan resource. A generated disk may be based off a snapshot from a volume of a workload. The volume identifier may be sent to the operator, for example, by a disk manager service.

At S340, a persistent volume (PV) for the generated disk is generated. In an embodiment the PV may be generated by the operator. A persistent volume is a storage resource which is provisioned in a cluster. Optionally, a CSI driver, implemented as a microservice in each different cloud environment, attaches the PV to the node used for inspection, and mounts the PV on the node.

In an embodiment, an instruction is generated to erase the PV in response to completing the disk inspection.

At S350, a pod is generated for disk inspection, with a persistent volume claim (PVC) on the PV. The PVC is a request to access a storage resource. A pod is a set of containers running on a cluster. For example, each container of the inspection pod may include an inspection application which inspects a workload for different types of objects, such as secrets, policies, applications, nested workloads, and the like.

At S360, results from the disk inspection pod are received. Results may be received as objects, which may be used to generate nodes for a graph database, such as the security graph described in FIG. 1 above. Objects may also be files, such as text files, containing passwords, certificates, and other information used for authenticating network communication, and the like.

At S370, at least a portion of the received results are stored in a graph database containing a security graph. Storing results may include generating a node in the security graph, wherein the node is generated based on a predefined schema of the security graph. In other embodiments storing results may include generating an edge connecting a first node to a second node.

Figure 4:
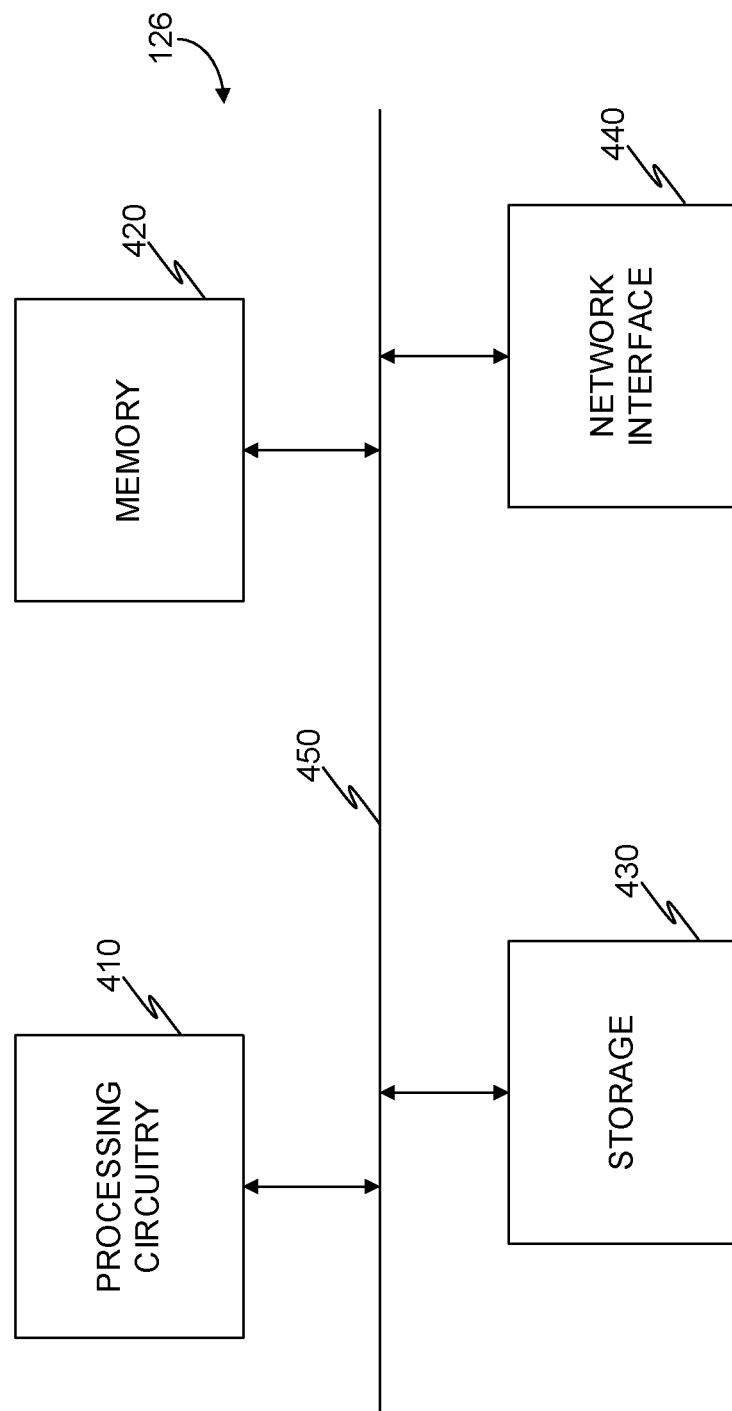
FIG. 4 is a schematic diagram of a controller according to an embodiment.

FIG. 4 is an example schematic diagram of a controller 126 according to an embodiment. The controller 126 includes a processing circuitry 410 coupled to a memory 420, a storage 430, and a network interface 440. In an embodiment, the components of the controller 126 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the controller 126 to communicate with, for example, the inspector 124, the graph database 122, and the like.

It should be understood that the embodiments described herein are not limited to the specific architecture illustrated in FIG. 4, and other architectures may be equally used without departing from the scope of the disclosed embodiments. Furthermore, other workloads described herein, such as the inspector 124, may utilize a similar architecture as the one described above.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. The terms workload, virtual instance, and resource are used throughout this disclosure interchangeably, unless otherwise noted.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for inspecting running containers in a cloud computing environment for cybersecurity threats, comprising:
   discovering a container running in a cloud computing environment;
   detecting an identifier of the running container, wherein the identifier includes an indicator to a repository in which an image of the container is stored, the repository further storing a plurality of images, wherein a second image of the plurality of images does not correspond to a container running in the cloud computing environment;
   accessing the repository to pull the image;
   inspecting the image of the running container for a cybersecurity threat;
   inspecting the image of the running container for the cybersecurity threat when the container is running in the cloud computing environment; and
   configuring an inspector to halt inspection of an image not corresponding to a container running in the cloud computing environment.

2. The method of claim 1, further comprising:
   parsing the identifier into a plurality of elements; and
   matching an element of the plurality of elements to a predetermined list of repository identifiers.

3. The method of claim 1, further comprising:
   generating a representation of the cloud computing environment in a security database.

4. The method of claim 3, further comprising:
   traversing a security graph stored in the security database; and
   inspecting a workload represented on the traversed security graph.

5. The method of claim 1, wherein the cybersecurity threat is any one of: a vulnerability, an exposure, a misconfiguration, and a combination thereof.

6. The method of claim 1, further comprising:
   providing application code to an inspector; and
   configuring the inspector to detect the cybersecurity threat in the provided application code.

7. The method of claim 1, further comprising:
   inspecting the image of the running container for detection of any one of: a secret, a key, a user account information, a nested workload, a policy, and a combination thereof.

8. A non-transitory computer-readable medium storing a set of instructions for inspecting running containers in a cloud computing environment for cybersecurity threats, the set of instructions comprising:
   one or more instructions that, when executed by one or more processors of a device, cause the device to:
   discover a container running in a cloud computing environment;

detect an identifier of the running container, wherein the identifier includes an indicator to a repository in which an image of the container is stored, the repository further storing a plurality of images, wherein a second image of the plurality of images does not correspond to a container running in the cloud computing environment;

access the repository to pull the image;

inspect the image of the running container for a cybersecurity threat;

inspecting the image of the running container for a cybersecurity threat;

inspecting the image of the running container for the cybersecurity threat when the container is running in the cloud computing environment; and configuring an inspector to halt inspection of an image not corresponding to a container running in the cloud computing environment.

9. A system for inspecting running containers in a cloud computing environment for cybersecurity threats comprising:

a processing circuitry; and a memory, the memory containing instructions that, when executed by the processing circuitry, configure the system to:

discover a container running in a cloud computing environment;

detect an identifier of the running container, wherein the identifier includes an indicator to a repository in which an image of the container is stored, the repository further storing a plurality of images, wherein a second image of the plurality of images does not correspond to a container running in the cloud computing environment;

access the repository to pull the image;

inspect the image of the running container for a cybersecurity threat;

inspect the image of the running container for the cybersecurity threat when the container is running in the cloud computing environment; and configure an inspector to halt inspection of an image not corresponding to a container running in the cloud computing environment.

10. The system of claim 9, wherein the memory contains further instructions which when executed by the processing circuitry further configure the system to:

parse the identifier into a plurality of elements; and match an element of the plurality of elements to a predetermined list of repository identifiers.

11. The system of claim 9, wherein the memory contains further instructions which when executed by the processing circuitry further configure the system to:

generate a representation of the cloud computing environment in a security database.

12. The system of claim 11, wherein the memory contains further instructions which when executed by the processing circuitry further configure the system to:

traverse a security graph stored in the security database; and inspect a workload represented on the traversed security graph.

13. The system of claim 9, wherein the cybersecurity threat is any one of: a vulnerability, an exposure, a misconfiguration, and a combination thereof.

14. The system of claim 9, wherein the memory contains further instructions which when executed by the processing circuitry further configure the system to:

provide application code to an inspector; and configure the inspector to detect the cybersecurity threat in the provided application code.

15. The system of claim 9, wherein the memory contains further instructions which when executed by the processing circuitry further configure the system to:

inspect the image of the running containers for detection of any one of: a secret, a key, a user account information, a nested workload, a policy, and a combination thereof.

* * * * *